United States Patent [19]

Kobayakawa et al.

[11] Patent Number: 5,625,846
[45] Date of Patent: Apr. 29, 1997

[54] TRANSFER REQUEST QUEUE CONTROL SYSTEM USING FLAGS TO INDICATE TRANSFER REQUEST QUEUE VALIDITY AND WHETHER TO USE ROUND-ROBIN SYSTEM FOR DEQUEUING THE CORRESPONDING QUEUES

[75] Inventors: Kazushige Kobayakawa; Shigeru Nagasawa; Masayuki Ikeda; Haruhiko Ueno; Naoki Shinjo; Teruo Utsumi; Masami Dewa; Kenichi Ishizaka, all of Kawasaki, Japan

[73] Assignee: Fujitsu Limited, Kawasaki, Japan

[21] Appl. No.: 166,100

[22] Filed: Dec. 14, 1993

[30] Foreign Application Priority Data

Dec. 18, 1992 [JP] Japan .................................. 4-339094

[51] Int. Cl.[6] ........................... G06F 13/00; G06F 13/14
[52] U.S. Cl. ........................ 395/872; 395/860; 395/875; 370/412
[58] Field of Search ................... 370/94.1, 110.1, 370/85.6; 395/400, 200, 250, 425, 872, 860, 875

[56] References Cited

U.S. PATENT DOCUMENTS

| | | | |
|---|---|---|---|
| 4,845,710 | 7/1989 | Nakamura et al. | 370/110.1 |
| 4,881,163 | 11/1989 | Thomas et al. | 395/250 |
| 5,161,215 | 11/1992 | Kouda et al. | 395/250 |
| 5,166,930 | 11/1992 | Braff et al. | 370/94.1 |
| 5,212,778 | 5/1993 | Dally et al. | 395/400 |
| 5,377,341 | 12/1994 | Kaneko et al. | 395/425 |
| 5,392,401 | 2/1995 | Barucchi et al. | 395/200 |

*Primary Examiner*—Thomas C. Lee
*Assistant Examiner*—Le Hien Luu
*Attorney, Agent, or Firm*—Staas & Halsey

[57] ABSTRACT

A transfer request queue control system for a parallel computer system includes a plurality of processing units each having a main storage storing instructions and data. An instruction processor reads the instructions from the main storage and executes the instructions. A transfer processor performs data transfers in packets, each comprising a header and body data and each data transfer comprising one or more packets. A network couples transmitting and receiving processing units, which are to perform a data transfer based on information included in the header of each packet, the header information being related to a destination of the data, an attribute of a memory access to the main storage and a length of the data. The transfer processor performs parallel processing by making a data transfer between the main storage and the network in successive packets, depending on the attribute of the memory access. The transfer processor of one of the processing units comprises a transfer request queue comprising a list of headers of respective packets corresponding to each of plural requested data transfers, a managing part for managing a transfer queue valid flag which indicates validity of a transfer request of the transfer request queue and a control part for performing a data transfer in response to a data transfer request and based on the transfer queue valid flag.

16 Claims, 7 Drawing Sheets

TRANSFER REQUEST QUEUE CONTROL SYSTEM USING FLAGS TO INDICATE TRANSFER REQUEST QUEUE VALIDITY AND WHETHER TO USE ROUND-ROBIN SYSTEM FOR DEQUEUING THE CORRESPONDING QUEUES

BACKGROUND OF THE INVENTION

The present invention generally relates to transfer request queue control systems and, more particularly to a transfer request queue control system which is applicable to a parallel computer system in which a plurality of processing units are connected.

In the parallel computer system (multi-processor system) in which a plurality of processing units are connected, a data transfer, which transfers data stored within a main storage of a first processing unit to a second processing unit, is carried out relatively frequently. Conventionally, the queuing of the data transfers with respect to the second processing unit is managed by a supervisor program (operating system) of the first processing unit. Accordingly, when the user makes a data transfer request with respect to the supervisor program of the first processing unit, the supervisor program generates an interrupt, with respect to the supervisor program, and the supervisor program then instructs the data transfer depending on the interrupt.

However, according to this conventional method, the interrupt is frequently generated by the data transfer request, and the overhead becomes large. In addition, no consideration has been given to how to cope with a situation where a plurality of users exist.

Hence, it is conceivable to prevent the overhead from becoming large by making the supervisor program intervene every time the data transfer request is made. According to this conceivable method, a write pointer and a read pointer are provided in a queue of the data transfer requests, and these pointers are managed directly by the user program. In addition, the access is made to the main storage of each processing unit using one virtual space. The data transfer is made in units of one packet, which is made up of a header and body data, and the header includes information such as the destination of the data and the length of the data. The queue of the data transfer requests corresponds to a list of the headers, and the pointer indicates a position within the list.

However, according to the conceivable method, when dequeuing the queue of the data transfer requests (hereinafter simply referred to as a transfer queue) the values of the write pointer and the read pointer must be made the same in order to stop the dequeuing if the dequeuing is to start when the write pointer and the read pointer differ. In other words, in order to stop the data transfer at an intermediate point, it is necessary to change the write pointer itself.

On the other hand, when there are a plurality of user programs and a plurality of transfer queues are provided, it is necessary to control the write pointer and the read pointer every time, since a portion of the transfer queue may be dequeued in a concentrated manner or a plurality of transfer queues may be dequeued uniformly. But the conventional parallel computer system is designed on the precondition that a single user executes a single user program, and is not designed on the precondition that a plurality of users will switch and execute the user programs.

For this reason, it requires a complex control, to control the write pointer and the read pointer, and there are problems in that the overhead becomes large and the processing performance of the system deteriorates.

SUMMARY OF THE INVENTION

Accordingly, it is a general object of the present invention to provide a novel and useful transfer request queue control system in which the problems described above are eliminated.

Another and more specific object of the present invention is to provide a transfer request queue control system, adapted to a parallel computer system, comprising a plurality of processing units each having a main storage storing instructions and data, an instruction processor reading the instructions from the main storage and executing the instructions, and a transfer processor for making a data transfer in units of a packet which is made up of a header and body data, and a network coupling two processing units which are to make the data transfer, based on information included in the header of the packet, and wherein the header includes information related to at least a destination of the data, an attribute of a memory access to the main storage and a length of the data. The transfer processor carries out a parallel process by making a data transfer between the main storage and the network in units of the packet, depending on the attribute of the memory access. The transfer processor of at least an arbitrary one of the processing units comprises managing means for managing a transfer queue valid flag, which indicates validity of a transfer request queue which is made up of a plurality of data transfer requests, and control means for making a data transfer in response to a data transfer request based on the transfer queue valid flag, and wherein the transfer request queue is a list of headers of the packets. According to the transfer request queue control system of the present invention, it is possible to easily determine whether or not to use the transfer request queue because the transfer queue valid flag is provided. In addition, it is possible to reduce the overhead of the user program and efficiently process the user programs in parallel, because there is no need to make the transfer queue write pointer and the transfer queue read pointer match in order to invalidate the transfer request queue.

Other objects and further features of the present invention will be apparent from the following detailed description when read in conjunction with the accompanying drawings.

DESCRIPTION OF THE PREFERRED EMBODIMENTS

Figure 1:
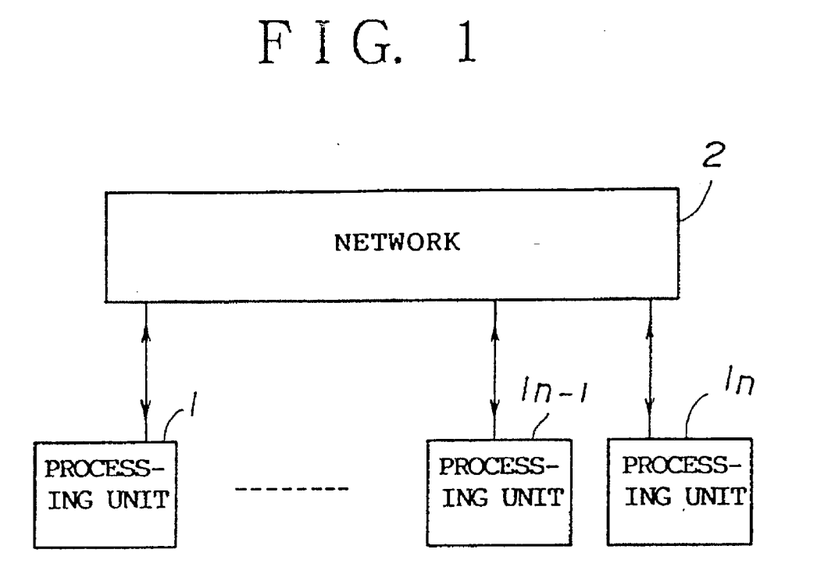
FIG. 1 is a system block diagram showing a parallel computer system, to which may be applied an embodiment of a transfer request queue control system according to the present invention.
Figure 2:
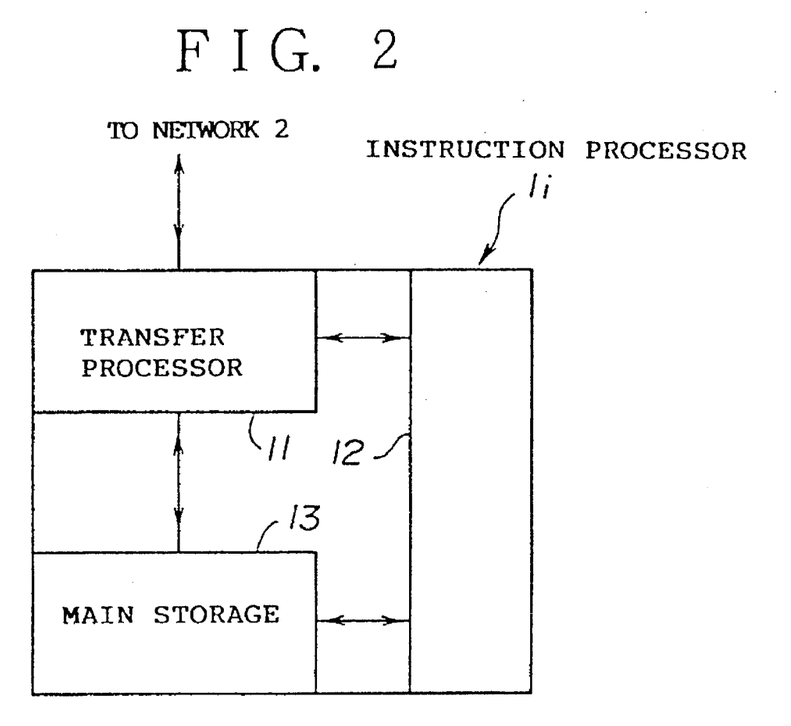
FIG. 2 is a system block diagram showing the structure of a processing unit of the parallel computer system.

FIG. 1 shows a parallel computer system (multi-processor system), to which may be applied an embodiment of a transfer request queue control system according to the present invention, and FIG. 2 shows the construction of a processing unit of the multi-processor system.

In FIG. 1, the multi-processor system generally includes a plurality of processing units $1_1$ through $1_n$, and a network 2 which connects to these processing units $1_1$ through $1_n$.

Each processing unit $1_i$ (i.e., where i=1, 2, . . . , n) comprises a transfer processor 11, an instruction processor 12, and a main storage 13 which are connected as shown in FIG. 2. The main storage 13 stores instructions (programs) and data. The instruction processor 12 reads the instructions (programs) from the main storage 13 and executes the instructions. The transfer processor 11 transfers the data between the main storage 13 and the network 2 in units of one packet.

Each packet is made up of a header and body data, and the header at least includes the destination of the data, the attribute of the memory access to the main storage 13, the data length and the like. Accordingly, the network 2 recognizes the destination within the header and carries out a switching operation so as to connect two processing units which are to make the data transfer. The network 2 may have a known construction which includes a plurality of switching circuits (not shown). In this case, the network 2 switches the switching circuits depending on the destination (that is, the receiving processing unit) within the header of the packet, and if the amount of body data from the source (that is, the transmitting processing unit) is not zero, the network 2 transfers the body data to the destination by referring to the information which indicates the attribute (access ID) of the memory access made during the data transfer. In other words, the body data are read from the main storage 13 of the transmitting processing unit and are written into the main storage 13 of the receiving processing unit via the network 2.

Figure 3:
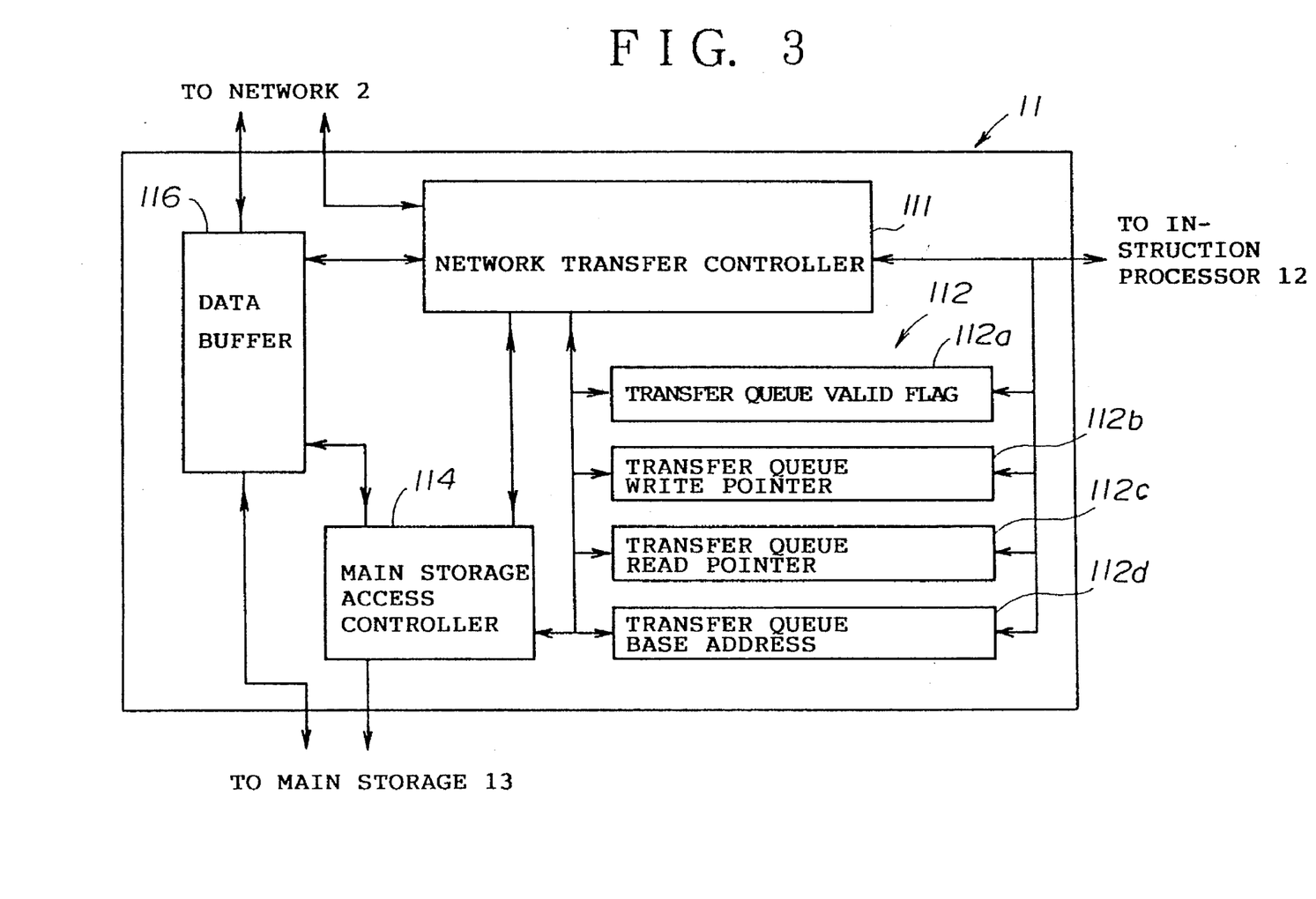
FIG. 3 is a system block diagram showing an embodiment of a transfer processor of the processing unit, when one (1) transfer queue exists.

FIG. 3 shows an embodiment of the transfer processor 11 when one (1) transfer queue exists. The transfer processor 11 includes a network transfer controller 111, a register part 112, a main storage access controller 114, and a data buffer 116.

The register part 112 includes registers 112a through 112d. The register 112a stores a transfer queue valid flag. The registers 112b and 112c respectively store a transfer queue write pointer and a transfer queue read pointer. In addition, the register 112d stores a transfer queue base address.

The transfer queue valid flag indicates the validity of the transfer request queue. The transfer queue write pointer indicates to which data transfer request of the transfer queue the instruction processor 12 has enqueued. The transfer queue read pointer indicates the data transfer request, of the transfer queue, for which the transfer processor 11 has finished the data transfer process. In addition, the transfer queue base address indicates a first address of the transfer queue in the main storage 13. The contents of the registers 112a through 112d of the register part 112 can be referred to and updated from the instruction processor 12. As will be described later, the number of register parts 112 is not limited to only one (1); instead, it is possible to provide a number of register parts corresponding to the number of user programs to be processed in parallel. In this embodiment, it is assumed for the sake of convenience that the register part 112 is provided with respect to a single user.

Figure 4:
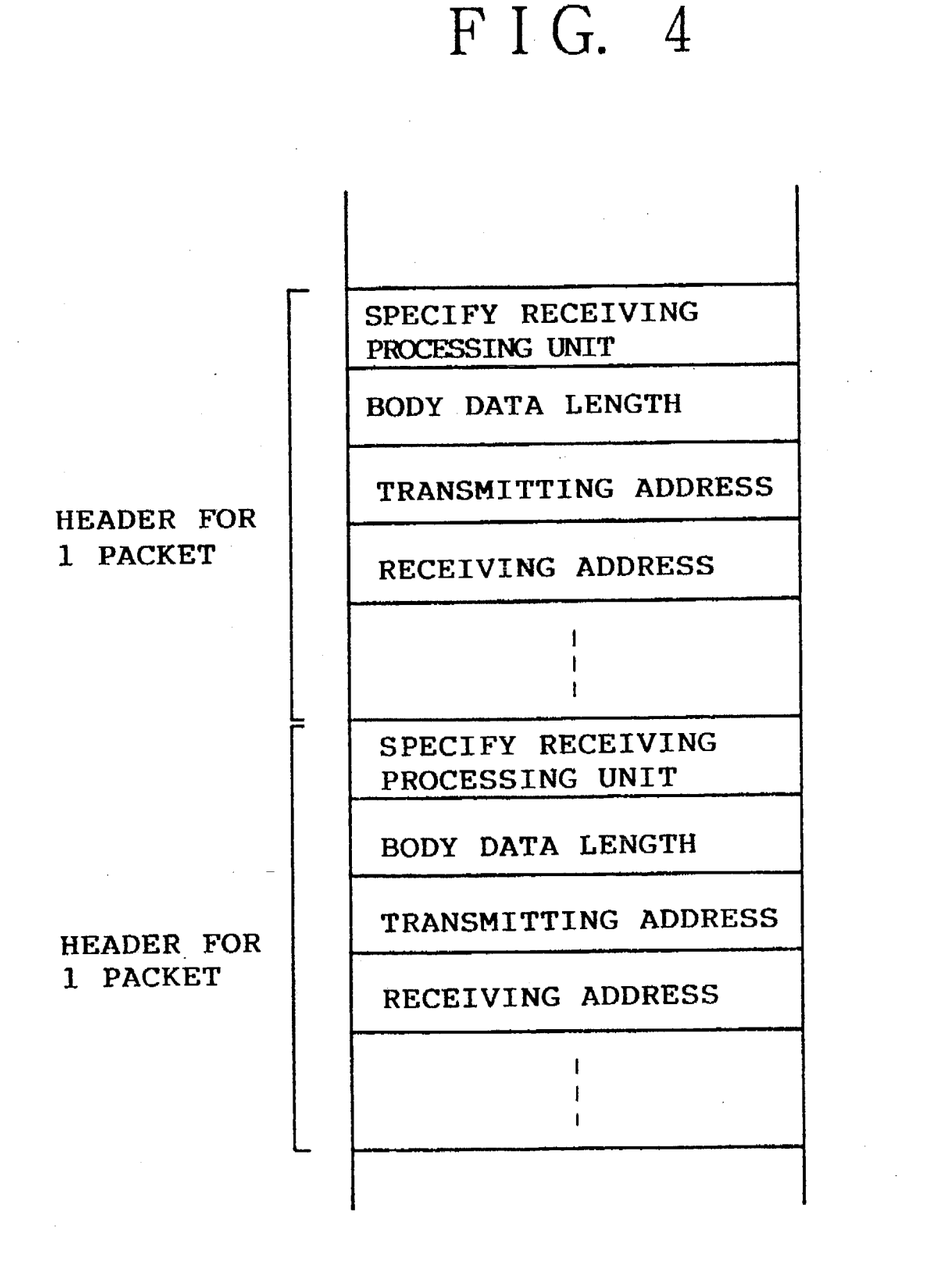
FIG. 4 is a diagram showing an embodiment of the structure of the transfer queue.

FIG. 4 shows an embodiment of the construction of the transfer queue. FIG. 4 shows the headers for two (2) respective packets. The header includes information specifying a receiving processing unit, information indicating the body data length, information indicating a transmitting address and a receiving address, and the like.

In FIG. 3, the network transfer controller (hereinafter simply referred to as a transfer controller) 111 is activated by an instruction from the instruction processor 12, and starts a data transfer process depending on the values of the transfer queue read pointer and the transfer queue write pointer. In addition, the transfer controller 111 issues a main storage access request to the main storage access controller 114 so as to read the header and the body data of the transferring packet. In addition, the transfer controller 111 controls an interface between the transfer processor 11 and the network 2, and controls the data transmission from the data buffer 116 to the network 2.

The main storage access controller (hereinafter simply referred to as an access controller) 114 makes an access to the main storage 13 depending on an instruction from the transfer controller 111, and controls the data transfer between the main storage 13 and the data buffer 116. In addition, the access controller 114 makes an address conversion, depending on the value of a space ID of the access specified by the information included in the header, and issues an access address with respect to the main storage 13.

The data buffer 116 temporarily buffers the data when making the data transfer between the main storage 13 and the network 2. In addition, the data buffer 116 temporarily buffers the data when the transfer controller 111 and the access controller 114 make the necessary reading and writing of the data with respect to the main storage 13.

The supervisor program (operating system) stores address conversion information within the access controller 114, prior to execution of the user program or, dynamically depending-on the request of the user program. The user program writes control information of the data transfer request into the main storage 13 in the form of the packet header at a position indicated by (transfer queue base address)+(transfer queue write pointer)×(header length). The control information of the data transfer request includes information specifying the receiving processing unit, the body data length, the transmitting address, the receiving address and the like. Then, the user program increments the transfer queue write pointer. Thereafter, the user program repeats the process of writing the control information of the data transfer request and incrementing the transfer queue write pointer, and ends the enqueuing process.

Next, a description will be given of the transfer processor 11 shown in FIG. 3 as a whole.

The transfer controller 111 waits for the enqueuing of the data transfer requests in a state where the transfer controller 111 is activated by the instruction from the instruction processor 12. However, the transfer controller 111 does not start the data transfer from the concerned transfer queue if the transfer queue valid flag within the register 112a indicates that the transfer request queue is invalid. On the other hand, if the transfer queue valid flag indicates that the transfer request queue is valid and the transfer queue write pointer and the transfer queue read pointer within the registers 112b and 112c do not match, the transfer controller 111 starts the data transfer process by recognizing that there exists a data transfer request which has not yet been processed. In this case, the transfer controller 111 issues a main storage access request to the access controller 114 in order to read the header of the transferring packet.

In response to the main storage access request, the access controller 114 calculates the address in the main storage 13 of the packet header of the oldest data transfer request which has not yet been processed, based on the transfer queue base address and the transfer queue read pointer which are respectively stored in the registers 112d and 112c, and issues an access request with respect to the main storage 13.

When the packet header is read from the main storage 13, the access controller 114 stores this packet header in the data buffer 116 and notifies the transfer controller 111 of the end of reading the packet header. The access controller 114 continues to obtain the control information of the data transfer request from the data buffer 116 to calculate the address of the packet body in the main storage 13, and issues a read access request with respect to the main storage 13.

When the packet body is successively read from the main storage 13, the access controller 114 successively stores the packet body in the data buffer 116, and successively notifies the transfer controller 111 of the amount of packet body read.

The transfer controller 111 obtains the control information of the data transfer request from the data buffer 116 when the transfer controller 111 is notified of the end of reading the packet header from the access controller 114. In addition, the transfer controller 111 carries out a predetermined check, with respect to the control information, and writes the control information back into the data buffer 116 after making a predetermined modification of the control information. Then, the transfer controller 111 transmits the packet header from the data buffer 116 to the network 2. Furthermore, the transfer controller 111 successively transmits the amount of packet body stored in the data buffer 116 to the network 2 when the access controller 114 successively notifies the transfer controller 111 of the amount of packet body read.

When the above described transmission of the packet to the network 2 ends, the transfer controller 111 increments the transfer queue read pointer which is stored in the register 112c within the register part 112. Next, if the transfer queue valid flag stored in the register 112a indicates that the transfer request queue is valid, the transfer controller 111 checks the values of the transfer queue write pointer and the transfer queue read pointer, which are respectively stored in the registers 112b and 112c, and starts the next data transfer process if there exists a data transfer request which has not yet been processed. The above described data transfer process is repeated until the values of the transfer queue read pointer and the transfer queue write pointer stored in the registers 112c and 112b become the same.

In FIG. 3, the functions of the transfer controller 111 and the access controller 114 may be realized by software. For the sake of convenience, a flow chart will be described later in conjunction with FIG. 8 for the case where a plurality of transfer queues exist.

Figure 5:
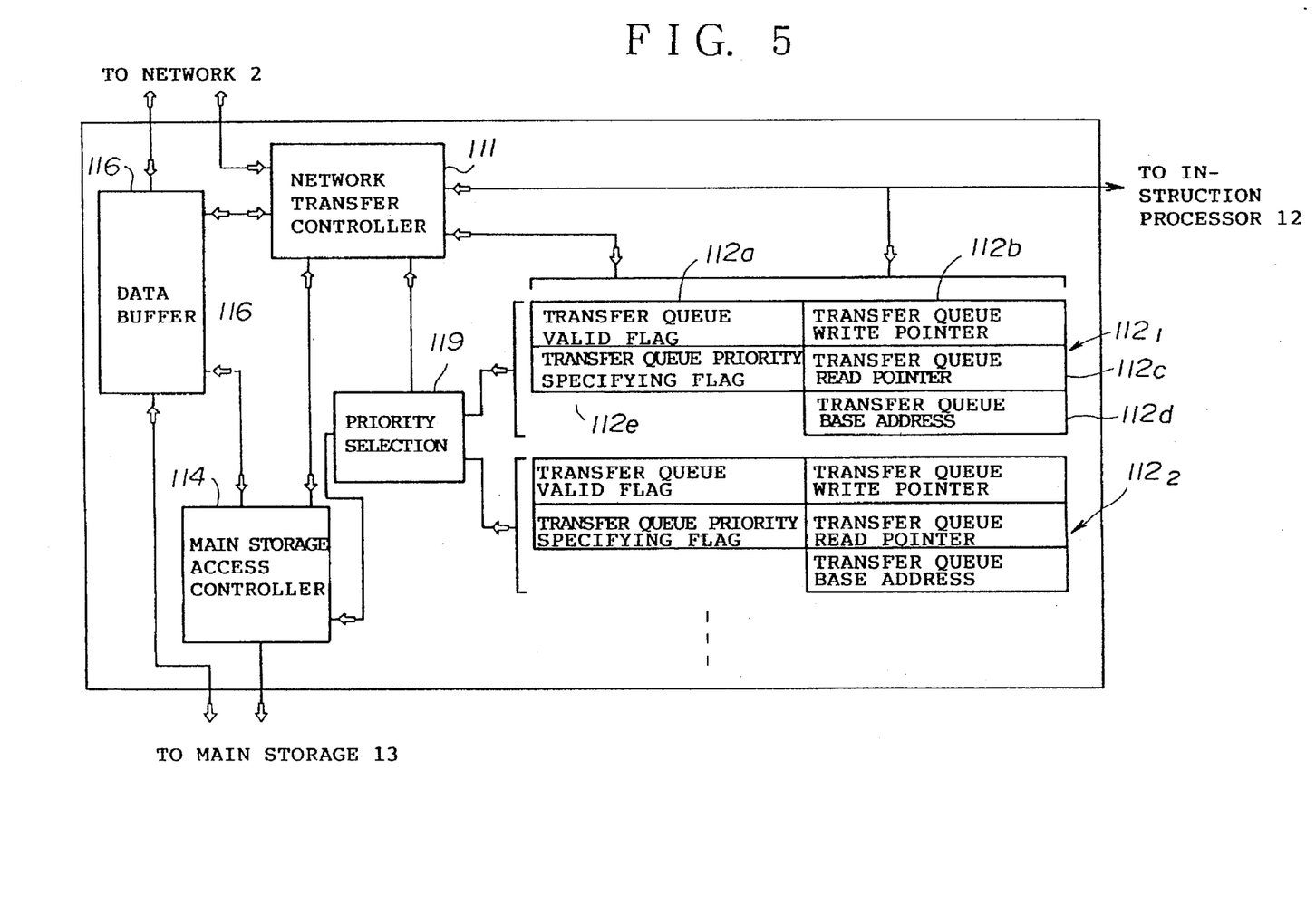
FIG. 5 is a system block diagram showing an embodiment of the transfer processor of the processing unit when a plurality of transfer queues exist.

FIG. 5 shows an embodiment of the transfer processor 11 when a plurality of transfer queues exist. In FIG. 5, those parts which are the same as those corresponding parts in FIG. 3 will be designated by the same reference numerals, and a description thereof will be omitted.

In this embodiment, n register parts $112_1, 112_2, \ldots, 112_n$ are provided in correspondence with n transfer queues. In FIG. 5, only the register parts $112_1$ and $112_2$ are shown for the sake of convenience. In addition, a priority selection circuit 119 is additionally provided. Each register part $112_i$ (where i=1, 2, ..., n) includes a register 112e which stores a transfer queue priority specifying flag, in addition to the registers 112a through 112d. This transfer queue priority specifying flag indicates the priority with which the corresponding transfer queue is to be executed. The transfer queue priority specifying flag stored in the register 112e can also be referred to and updated from the instruction processor 12. The priority selection circuit 119 selects the transfer queue depending on the priority which is specified by the transfer queue priority specifying flag which is stored in the register 112e.

Prior to enqueuing the data transfer requests, the user program sets the priority of each transfer queue in the register 112e of the corresponding register part as the transfer queue priority specifying flag. The priority selection circuit 119 selects the transfer queue having the highest priority, based on the transfer queue priority specifying flags which are stored in the registers 112e of the register parts $112_1$ through $112_n$, when the transfer controller 111 is in the state waiting for the enqueuing of the data transfer requests and wherein the data transfer requests are made from a plurality of transfer queues. In addition, the priority selection circuit 119 supplies the transfer queue write pointer, the transfer queue read pointer and the transfer queue base address, which are respectively stored in the registers 112b, 112c and 112d of the corresponding register part, to the transfer controller 111 so as to request the data transfer process.

When the transfer controller 111 ends the data transfer with respect to the network 2, the priority selection circuit 119 increments the transfer queue read pointer which is stored in the register 112c of the corresponding register part. Then, if there exists a data transfer request which has not yet been processed, the priority of this remaining data transfer request is checked, and the operations similar to the above are repeated until all of the data transfer requests are processed.

The priority selection circuit 119 selects the transfer queue having the highest priority, when a different priority is specified by the transfer queue priority specifying flag, for every transfer queue. When the packets of the transfer queue having the highest priority are all transferred with respect to the network 2 and dequeued, the transfer queue having the next highest priority is successively selected. If the same priority is assigned to a plurality of transfer queues, the priority selection circuit 119 selects the transfer queues having the same priority in an arbitrary order. For example, the transfer queues having the same priority are selected according to a round-robin system.

Figure 6:
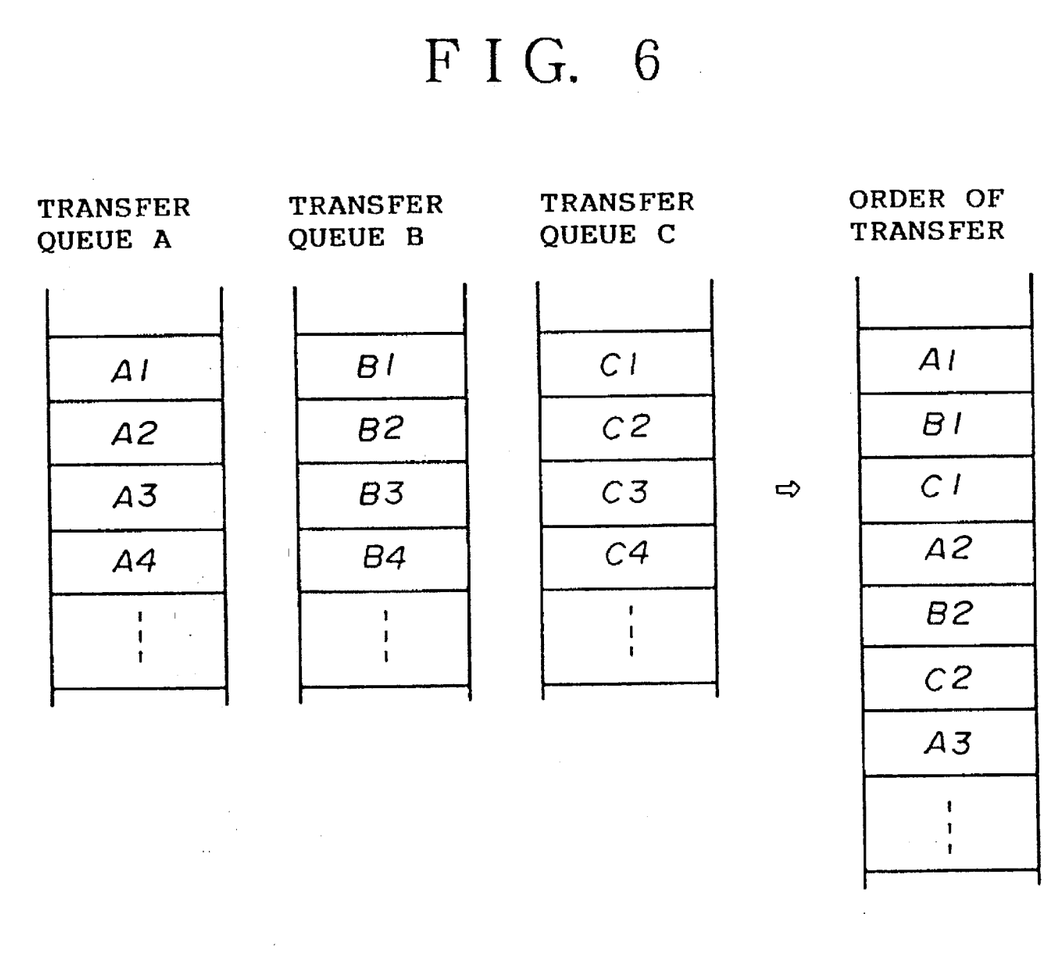
FIG. 6 is a diagram for explaining the selection of the transfer queue according to a round-robin system.

FIG. 6 shows a case where the same priority is assigned to three (3) transfer queues A, B and C and these transfer queues A, B and C are selected according to the round-robin system. In this case, the priority selection circuit 119 first selects the transfer queue A, and one (1) packet (i.e., a single packet) is transferred and dequeued by this selection. Next, the priority selection circuit 119 selects the transfer queue B, and one (1) packet is transferred and dequeued by this selection. Furthermore, the priority selection circuit 119 selects the transfer queue C, and one (1) packet is transferred and dequeued by this selection. Then, the priority selection circuit 119 selects the transfer queue A, and one (1) packet is transferred and dequeued by this selection. Similarly thereafter, the transfer queues B, C and A are sequentially selected, and one (1) packet is transferred and dequeued each time the selection is made.

Figure 7:
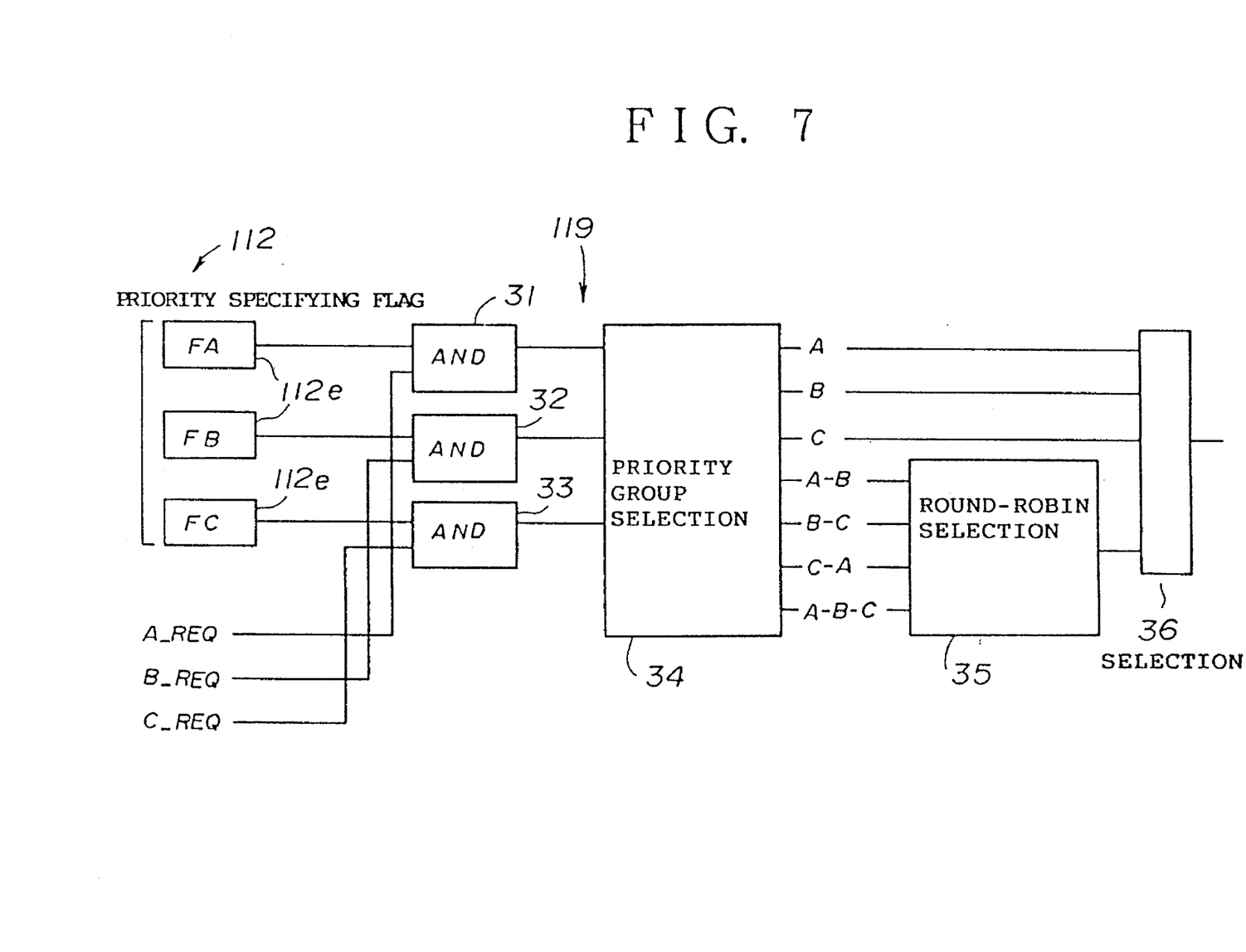
FIG. 7 is a system block diagram showing an embodiment of a priority selection circuit.

FIG. 7 shows an embodiment of the priority selection circuit 119 for a case where the same priority is assigned to the three (3) transfer queues A, B and C. The priority selection circuit 119 includes AND circuits 31 through 33, a priority group selection circuit 34, a round-robin selection circuit 35, and a selection circuit 36.

The transfer queues A, B and C and corresponding priority specifying flags FA, FB and FC are supplied to the respective AND circuits 31 through 33. Based on the priority specifying flags FA through FC obtained from the AND circuits 31 through 33, the priority group selection circuit 34 outputs the transfer queues A through C to the selection circuit 36 if the priorities of these transfer queues A through C differ. On the other hand, if at least two (2) of the transfer queues A through C have the same priority, those transfer queues having the same priority are output from the priority group selection circuit 34 to the round-robin selection circuit 35. The round-robin selection circuit 35 outputs the two (2) or three (3) transfer queues having the same priority to the selection circuit 36 according to the round-robin system. The selection circuit 36 outputs the transfer queues in a priority order starting from the transfer queue having the highest priority.

Figure 8:
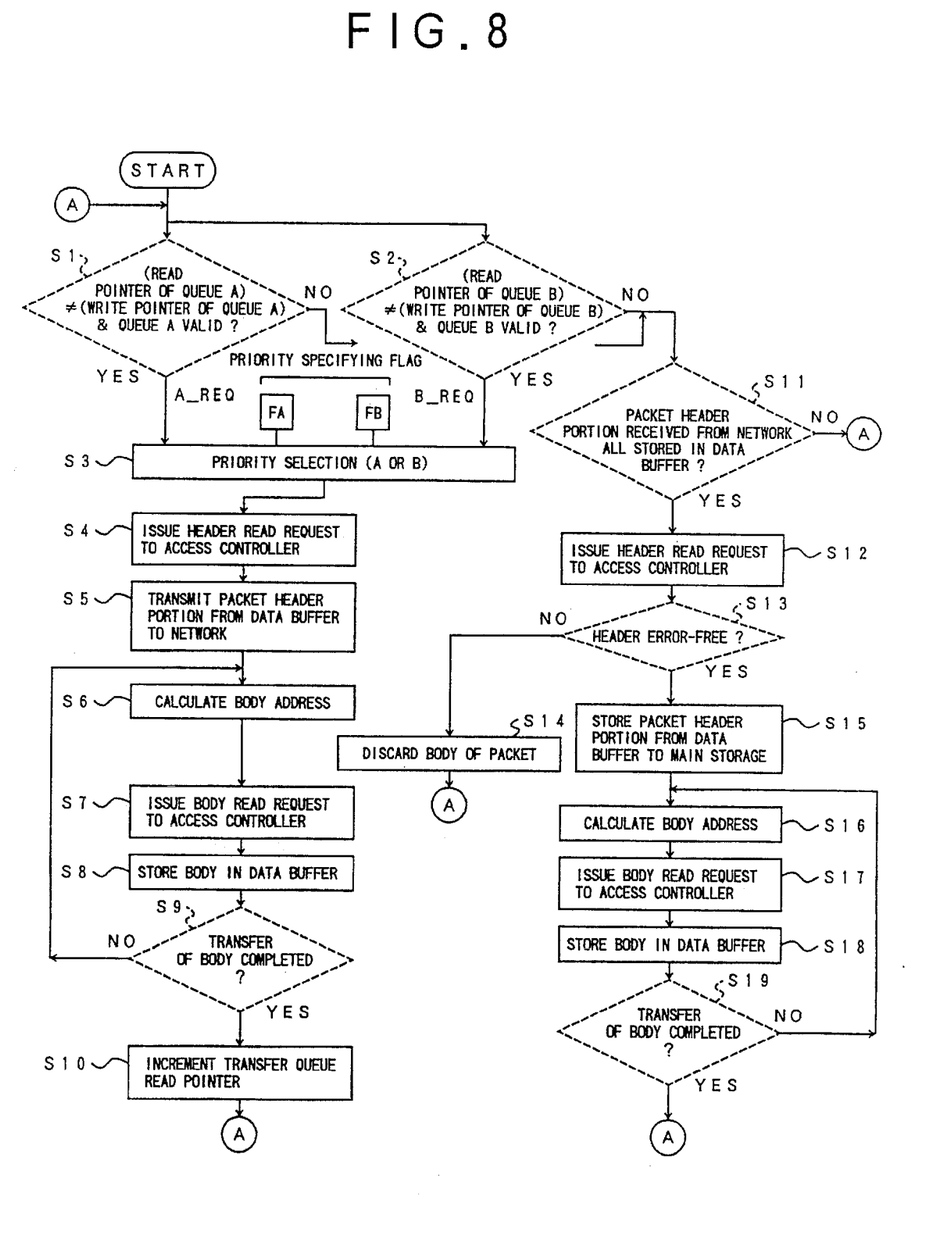
FIG. 8 is a flow chart for explaining the operation of the transfer controller and an access controller of the transfer processor.

Next, a description will be given of the software which realizes the functions of the transfer controller 111 and the access controller 114 shown in FIG. 5 when a plurality of transfer queues exist, by referring to the flow chart shown in FIG. 8. In FIG. 8, it is assumed for the sake of convenience that two (2) transfer queues A and B exist.

In FIG. 8, a step S1 refers to the register part $112_1$ and decides whether or not the values of the transfer queue read pointer and the transfer queue write, pointer differ and also whether or not the transfer queue valid flag of the transfer queue A indicates that the transfer queue A is valid. In addition, a step S2 refers to the register part $112_2$ and decides whether or not the values of the transfer queue read pointer and the transfer queue write pointer differ and also whether or not the transfer queue valid flag of the transfer queue B indicates that the transfer queue B is valid. If the decision results in the steps S1 and S2 are YES, a step S3 refers to the register parts $112_1$ and $112_2$ and selects the transfer queue A or B having the higher priority based on the transfer queue priority specifying flags FA and FB of these transfer queues A and B.

A step S4 issues a header read request with respect to the access controller 114. A step S5 transmits the header portion of the packet from the data buffer 116 to the network 2. In addition, a step S6 calculates a body address.

A step S7 issues a body read request with respect to the access controller 114. A step S8 stores the body into the data buffer 116. In addition, a step S9 decides whether or not the transfer of the body has been completed. If the decision result in the step S9 is NO, the process returns to the step S6. But if the decision result in the step S9 is YES, the process advances to a step S10. The step S10 increments the transfer queue read pointer within the register part $112_1$ or $112_2$ which corresponds to the selected transfer queue, and the process returns to the steps S1 and S2.

On the other hand, if the decision results in the steps S1 and S2 are NO, a step S11 decides whether or not all of the header portion of the packet received from the network 2 is stored in the data buffer 116. If the decision result in the step S11 is NO, the process returns to the steps S1 and S2. On the other hand, the process advances to a step S12 if the decision result in the step S11 is YES. The step S12 issues a header read request with respect to the access controller 114. A step S13 checks the header and decides whether or not the header is error-free. If the decision result in. the step S13 is NO, a step S14 discards the body of the packet following the erroneous header, and the process returns to the steps S1 and S2.

If the decision result in the step S13 is YES, a step S15 stores the header portion of the packet into the main storage 13 from the data buffer 116. A step S16 calculates a body address, and a step S17 issues a body read request with respect to the access controller 114. A step S19 decides whether or not the transfer of the body has been completed. The process returns to the step S16 if the decision result in the step S19 is NO, but the process returns; to the steps S1 and S2 if the decision result in the step S19 is YES.

According to the conceivable method described above, when the write pointer and/or the read pointer is written and these pointers differ, the data transfer is started immediately thereafter. However, this will not occur according to the embodiments of the invention described above. In other words, it is possible to stop (i.e., inhibit) the start of the data transfer until the transfer queue valid flag indicates that the concerned transfer request queue is valid. For this reason, the programming flexibility of the user program is improved according to the described embodiments.

Further, the present invention is not limited to these embodiments, but various variations and modifications may be made without departing from the scope of the present invention.

What is claimed is:

1. A transfer request queue control system for a parallel computer system, said transfer request queue control system comprising:

a plurality of processing units each having a main storage storing instructions and data, an instruction processor reading the instructions from the main storage and executing the instructions, and a transfer processor performing data transfers in units of a packet, each packet comprising a header and body data and each data transfer comprising one or more packets;

a network coupling a transmitting processing unit and a receiving processing unit which .are to perform a data transfer in accordance with a packet thereof and based on information included in them header of the packet, said header including information related to at least a destination of the data, an attribute of a memory access to the main storage and a length of the data, said transfer processor carrying out a parallel process by making a data transfer between the main storage and the network in successive packets depending on the attribute of the memory access; and said transfer processor of said transmitting processing unit comprising:

a transfer request queue comprising a list of headers of respective packets corresponding to each of plural requested data transfers.

managing means for managing a transfer queue valid flag, which is associated with the transfer request queue and indicates validity of the transfer request queue and thereby whether or not to transfer the packet enqueued in the transfer request queue, for managing respective, plural transfer queue priority specifying flags for a plurality of transfer revest queues, each said transfer queue priority specifying flag indicating a corresponding priority with which the respective transfer request queue is to be executed, and for dequeuing two or more transfer request queues according to a round-robin system if the respective transfer queue priority specifying flags of said two or more transfer request queues indicate a common priority, and control means for performing a data transfer in response to a data transfer request based on the transfer queue valid flag.

2. The transfer request queue control system as claimed in claim 1, wherein said managing means manages respective transfer queue valid flags for a plurality of transfer request queues.

3. The transfer request queue control system as claimed in claim 2, wherein said transfer queue valid flag is set for each transfer request queue. request queue.

4. The transfer request queue control system as claimed in claim 1, wherein respective said transfer queue valid flags are set for a plurality of transfer request queues.

5. The transfer request queue control system as claimed in claim 4, wherein said managing means further comprises means for managing respective, transfer queue priority specifying flags for the plurality of transfer request queues, each said transfer queue priority specifying flag indicating a designated priority with which the corresponding transfer request queue is to be executed.

6. The transfer request queue control system as claimed in claim 5, wherein said transfer queue priority specifying flag is set for each transfer request queue.

7. The transfer request queue control system as claimed in claim 5, wherein said managing means further comprises means for dequeuing two or more transfer request queues according to a round-robin system if the respective transfer queue priority specifying flags of said two or more transfer request queues indicate the same priority.

8. The transfer request queue control system as claimed in claim 1, wherein respective said transfer queue priority specifying flags are set for the plurality of transfer request queues.

9. A processing unit for a parallel computer system which comprises a plurality of processing units and a network coupling a transmitting processing unit and a receiving processing unit, said transmitting processing unit comprising:

a main storage storing instructions and data;

an instruction processor reading the instructions from the main storage and executing the instructions; and a transfer processor performing a data transfer in packets, each of said packets comprising a header and body data and each data transfer comprising one or more packets, each data transfer being performed, based on information included in the corresponding header of the packet, said header including information related to at least a destination of the data, an attribute of a memory access to the main storage and a length of the data, said transfer processor carrying out a parallel process by making a data transfer between the main storage and the network in successive packets depending on the attribute of the memory access said transfer processor further comprising:

a transfer request queue comprising a list of headers of respective packets corresponding to each of plural requested data transfers, managing means for managing a transfer queue valid flag, which is associated with the transfer request queue and indicates a validity of the transfer request queue and thereby whether or not to transfer the packet enqueued in the transfer request queue, for managing respective, plural transfer queue priority specifying flags for a plurality of transfer request queues, each said transfer queue priority specifying flag indicating a corresponding priority with which the respective transfer request queue is to be executed, and for dequeuing two or more transfer request queues according to a round-robin system if the respective transfer queue priority specifying flags of said two or more transfer request queues indicate a common priority, and control means for performing a data transfer in response to a data transfer request based on the transfer queue valid flag.

10. The processing unit as claimed in claim 9, wherein said managing means manages respective transfer queue valid flags for a plurality of transfer request queues.

11. The processing unit as claimed in claim 10, wherein said transfer queue valid flag is set for each transfer request queue.

12. The processing unit as claimed in claim 9, wherein respective said transfer queue valid flags are set for a plurality of transfer request queues.

13. The processing unit as claimed in claim 12, wherein said managing means further comprises means for managing respective, transfer queue priority specifying flags for the plurality of transfer request queues, each said transfer queue priority specifying flag indicating a designated priority with which the corresponding transfer request queue is to be executed.

14. The processing unit as claimed in claim 13, wherein said transfer queue priority specifying flag is set for each transfer request queue.

15. The processing unit as claimed in claim 13, wherein said managing means further comprises means for dequeuing two or more transfer request queues according to a round-robin system if the respective transfer queue priority specifying flags of said two or more transfer request queues indicate the same priority.

16. The processing unit as claimed in claim 9, wherein respective said transfer queue priority specifying flags are set for the: plurality of transfer request queues.

* * * * *

UNITED STATES PATENT AND TRADEMARK OFFICE
CERTIFICATE OF CORRECTION

PATENT NO. : 5,625,846
DATED : Apr. 29, 1997
INVENTOR(S) : KOBAYAKAWA et al.

It is certified that error appears in the above-indentified patent and that said Letters Patent is hereby corrected as shown below:

Col. 4, line 39, change "depending-on" to --depending on--.

Col. 7, line 30, after "write" delete "," (comma);
line 67, after "in" delete "." (period).

Col. 8, line 11, after "returns" delete ";" (semicolon);
line 61 (Claim 1, line 33), change "revest" to --request--.

Col. 9, line 12 (Claim 3, line 3), delete "request queue." (second occurrence).

Col. 10, line 2 (Claim 9, line 20), after "access" insert --,-- (comma);
line 52 (Claim 16, line 3), after "the" delete ":" (colon).

Signed and Sealed this

Twenty-first Day of October 1997

Attest:

BRUCE LEHMAN

Attesting Officer

Commissioner of Patents and Trademarks